United States Patent
Richter

(10) Patent No.: US 12,155,279 B2
(45) Date of Patent: Nov. 26, 2024

(54) METHOD FOR PRODUCING A STATOR

(71) Applicant: Bayerische Motoren Werke Aktiengesellschaft, Munich (DE)

(72) Inventor: Jens Richter, Neubiberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 939 days.

(21) Appl. No.: 17/259,233

(22) PCT Filed: Jun. 24, 2019

(86) PCT No.: PCT/EP2019/066580
§ 371 (c)(1),
(2) Date: Jan. 11, 2021

(87) PCT Pub. No.: WO2020/011515
PCT Pub. Date: Jan. 16, 2020

(65) Prior Publication Data
US 2021/0273534 A1  Sep. 2, 2021

(30) Foreign Application Priority Data

Jul. 12, 2018 (DE) .................... 10 2018 211 655.5

(51) Int. Cl.
*H02K 15/00* (2006.01)
*H02K 3/50* (2006.01)

(52) U.S. Cl.
CPC .......... *H02K 15/0043* (2013.01); *H02K 3/50* (2013.01)

(58) Field of Classification Search
CPC .. H02K 15/0081; H02K 3/50; H02K 15/0043; H02K 3/52

USPC ....................................... 310/254.1
See application file for complete search history.

(56) References Cited

U.S. PATENT DOCUMENTS

| | | | | |
|---|---|---|---|---|
| 4,215,464 A | * | 8/1980 | Miller | H02K 3/50 310/71 |
| 4,318,022 A | * | 3/1982 | Miller | H02K 15/0068 310/260 |
| 6,469,413 B1 | * | 10/2002 | Oohashi | H02K 11/05 310/201 |

(Continued)

FOREIGN PATENT DOCUMENTS

| | | |
|---|---|---|
| CN | 1788402 A | 6/2006 |
| CN | 101689778 A | 3/2010 |

(Continued)

OTHER PUBLICATIONS

International Search Report (PCT/ISA/210) issued in PCT Application No. PCT/EP2019/066580 dated Sep. 4, 2019, with English translation (four (4) pages).

(Continued)

*Primary Examiner* — Alex W Mok
(74) *Attorney, Agent, or Firm* — Crowell & Moring LLP

(57) ABSTRACT

A method for producing a stator includes the steps of: providing a stator, which has one or more windings and a winding head, the winding head having one or more cable ends; positioning a phase connection assembly by way of a retaining element on the winding head, the phase connection assembly having at least one cable element; connecting the at least one cable element to a corresponding cable end of the winding head; and removing the retaining element.

8 Claims, 3 Drawing Sheets

(56) References Cited

U.S. PATENT DOCUMENTS

| | | | | |
|---|---|---|---|---|
| 6,774,511 | B2* | 8/2004 | Chochoy | H02K 3/528 |
| | | | | 310/43 |
| 8,143,752 | B2* | 3/2012 | Altindis | H02K 3/522 |
| | | | | 310/71 |
| 2003/0173854 | A1* | 9/2003 | Oppitz | H02K 3/522 |
| | | | | 310/184 |
| 2005/0151439 | A1* | 7/2005 | Grundl | H02K 3/12 |
| | | | | 310/201 |
| 2007/0007832 | A1 | 1/2007 | Ichikawa et al. | |
| 2010/0060100 | A1 | 3/2010 | Urano et al. | |
| 2013/0069472 | A1* | 3/2013 | Wolf | H02K 15/04 |
| | | | | 310/180 |
| 2014/0232223 | A1 | 8/2014 | Takasaki | |
| 2019/0097506 | A1 | 3/2019 | Hashimoto et al. | |

FOREIGN PATENT DOCUMENTS

| | | |
|---|---|---|
| CN | 104025425 A | 9/2014 |
| CN | 107624213 A | 1/2018 |
| CN | 107852058 A | 3/2018 |
| DE | 11 2004 000 799 T5 | 11/2006 |
| DE | 10 2015 208 902 A1 | 11/2016 |
| DE | 11 2012 003 994 B4 | 8/2017 |
| DE | 11 2016 002 113 T5 | 3/2018 |
| DE | 10 2016 219 221 A1 | 4/2018 |
| JP | 2010-233386 A | 10/2010 |
| JP | 2011-205864 A | 10/2011 |

OTHER PUBLICATIONS

German-language Written Opinion (PCT/ISA/237) issued in PCT Application No. PCT/EP2019/066580 dated Sep. 4, 2019 (six (6) pages).

German-language Search Report issued in German Application No. 10 2018 211 655.5 dated Jun. 14, 2019, with partial English translation (11 pages).

English translation of Chinese-language Office Action issued in Chinese Application No. 201980035119.3 dated Nov. 23, 2022 (five (5) pages).

* cited by examiner

METHOD FOR PRODUCING A STATOR

BACKGROUND AND SUMMARY OF THE INVENTION

The present invention relates to a method for producing a stator and a retention element for use in the production of a stator.

Stators for electrical machines have coils or windings which have to be connected and supplied with electrical power. DE 10 2015 208 902 A1 proposes, for example, a connection device with a plurality of connection conductors which are cast in a mutually electrically insulated manner in a plastics material body with a metal/plastics composite component being formed. As a particular feature, the plastics body forms a vessel-like receiving space which encloses the winding connection regions, wherein this receiving space may be cast, for example, with a casting compound. However, such concepts known from the prior art have the disadvantage that the connection device, in particular the above-mentioned plastics material body, remains permanently on the stator as an additional component, takes up structural space and where applicable also makes cooling more difficult, in particular of the winding head of the stator which is formed at the end side. The application of the above-mentioned casting compound is also problematic since it, on the one hand, increases the weight of the stator or the entire electrical machine and, on the other hand, makes cooling of the metal conductor more difficult since they are covered by the casting compound. In addition, creeping paths or material bridges may be formed along such components if an electrical and/or chemical protective layer is applied, wherein as a result of the different thermal material expansion or as a result of vibration loading there is often a risk of breakage. The same applies to the connection device per se in the same manner.

An object of the present invention is therefore to provide a method for producing or completing a stator of an electrical machine and a retention element which enable the above-mentioned disadvantages to be overcome and a highly efficient stator for an electrical machine to be provided.

This object is achieved by a method and by a retention element according to the independent claims. Other advantages and features will be appreciated from the dependent claims and the description and the appended Figures.

According to the invention, a method for producing or complementing or completing a stator of an electrical machine comprises the steps of:

providing a stator, comprising one or more windings and a winding head, wherein the winding head comprises one or more conductor ends or winding ends;

positioning a phase connection sub-assembly by way of a retention element on the winding head, wherein the phase connection sub-assembly comprises at least one conductor element;

connecting the at least one conductor element to a corresponding conductor end or winding end of the winding head; and removing the retention element, in particular from the winding head or from the stator.

Preferably, it is a stator with a form bar winding. With so-called hairpin technology, a corresponding form wire is bent in a two- or three-dimensional manner to form a hairpin and inserted into a stator lamination bundle of the stator. The actual winding head is then formed by interlacing the hairpin. To this end, the ends of the hairpin are interlaced in accordance with the desired circuit diagram, for example, in opposite directions, cut to the correct length and subsequently welded so that a coil which extends through the stator is produced. Advantageously, the winding or the winding head has a large number of winding or conductor ends which inter alia are provided for the power supply of the stator. The phase connection sub-assembly serves to connect or pass on these winding or conductor ends, wherein to this end it has a corresponding large number of conductor elements.

Preferably, the phase connection sub-assembly comprises or forms a (UVW) connection of the stator or the electrical machines. In addition, some windings or conductor ends of the winding head or the winding(s) are also provided to form a neutral point, depending on the desired type of connection. The neutral point is also produced by means of corresponding conductor elements, arranged in the phase connection sub-assembly. The retention element per se facilitates in particular the handling of the phase connection sub-assembly, that is to say, the phase connections or the switching bridges which, for example, are required to produce the above-mentioned star circuit but does not produce a fixed or permanent connection to the above-described conductor elements or to the winding head. Instead, the significant advantage is that the retention element can be removed again after securing the at least one conductor element to the corresponding conductor end or winding head end of the winding head. In this regard, the phase connection sub-assembly is also intended to be considered to be a type of welding gauge. Such a winding head, which has no additional auxiliary or support structures, can, if at all necessary, be cast in a very specific and precise manner, coated or where applicable also be left untreated. Consequently, this construction enables optimum cooling of the stator or the electrical machine. Furthermore, a safeguarding of the durability of the retention element per se over the service-life of the electric motor can be dispensed with since it is in any case removed again.

The above-mentioned positioning is in particular intended to be understood to be a placement of the retention element on the winding head, that is to say, as a positive-locking and/or non-positive-locking arrangement or securing of the retention element on or in the region of the winding head. This can be carried out by hand or also mechanically, for example, using a robot.

According to an embodiment, the method comprises the step of: removing the retention element from the winding head in a destruction-free manner.

Advantageously, the retention element according to an embodiment is formed in such a manner that it can be reused. To this end, the retention element is simply where applicable newly "equipped", that is to say, provided with corresponding conductor elements.

Alternatively, it may also be a "disposable" retention element which is destroyed for disassembly. To this end, for example, already during production, desired or predefined breaking locations may be provided. Advantageously, the retention element enables "clean" destruction, that is to say, it is configured or constructed in such a manner that during removal no particles, etc., which could potentially contaminate the stator, are produced.

According to an embodiment, the method comprises the step of:

at least partially deforming or shaping the retention element for removal from the winding head.

Advantageously, the retention element is to this end accordingly at least partially constructed to be bendable, pliable or resilient so that it can be released from the winding head, in particular in a destruction-free manner. This can be carried out by means of a suitable geometry and/or by means of a corresponding selection of material.

According to an embodiment, the method comprises the step of: securing the at least one conductor element in or on the retention element in a positive-locking and/or non-positive-locking manner.

Advantageously, the at least one conductor element is, for example, clip-fitted. In particular, for example, the above-mentioned phase connections and/or the switch bridges are clip-fitted, wherein the retention element has to this end correspondingly formed arrangement regions or positive-locking elements. They are preferably constructed in such a manner that a positioning or a retention of the conductor elements is enabled, wherein this does not, however, have to be permanent since the retention element is removed again after the conductor elements have been connected, for example, welded to the appropriate or corresponding winding or conductor ends. Advantageously, the arrangement regions or positive-locking elements enable a positive-locking and/or non-positive-locking securing or arrangement of the above-mentioned elements.

At this point, it should be mentioned that the basic notion is not suitable exclusively for stators with a form bar winding, but can instead be used for extremely different conductor types, winding types or winding diagrams.

When the at least one conductor element is connected to the corresponding conductor end, a connection location is formed, for example, as a result of the welding operation. Advantageously, the method comprises the step of: arranging and positioning or shaping the at least one conductor element and/or the conductor end in such a manner that the connection location faces away from the stator.

That is to say, the connection location is orientated away from the stator. To this end, the conductor elements or the conductor ends are advantageously accordingly also directed or orientated away from the stator or the winding head. Advantageously, the retention element is arranged in an arrangement direction on the winding head or placed along it. The arrangement direction is in this instance directed toward the stator and extends parallel with a rotation axis of a rotor of the electrical machine arranged in the stator. The above-mentioned conductor ends or conductor elements extend almost at the ends thereof parallel with the above-mentioned rotation axis counter to the arrangement direction so that, after the arrangement of the retention element on the winding head, when viewed in the arrangement direction, first the connection locations are provided, then the retention element and in a manner of speaking lastly the winding head. This facilitates in particular the accessibility of the connection locations for further processing and removal of the retention element.

According to an embodiment, the method comprises the step of: at least partially casting or coating the winding head after removal of the retention element.

By dispensing with additional auxiliary or support structures and in particular by removing the retention element, the winding head can be cast, coated or also left untreated in an optimum manner. Consequently, this construction type enables optimum cooling. Furthermore, a safeguarding of the durability of the retention element over the component service-life is dispensed with since it does not remain on the completed motor. The coating or where applicable also the insulation of the winding head may be both an electrical and a chemical insulation or coating.

The invention is also based on a retention element for use in a method according to the invention, wherein the retention element is constructed in such a manner that it can be releasably secured to a winding head of a stator. In particular, the retention element is accordingly also releasably secured to a phase connection sub-assembly. The significant advantage is that, after the phase connection sub-assembly has been secured, for example, therefore, after welding of the corresponding conductor ends, the retention element is removed again. The winding head subsequently accordingly comprises only the electrical conductors without the retention element or any auxiliary or retention structures and can be cast, coated or also be left untreated in an optimum manner. Such a construction type enables inter alia optimum cooling.

According to a preferred embodiment, the retention element has or comprises a carrier structure and a securing structure, wherein the carrier structure and the securing structure are arranged to be offset with respect to each other. That is to say, the retention element is constructed in a manner of speaking in two layers, wherein a first layer provides for the securing function of the retention element on the winding head or the corresponding conductor elements or the conductor ends on the retention element. With respect to the above-mentioned arrangement direction in this instance, first the carrier structure and then the securing structure is advantageously provided. This enables in particular easy arrangement or removal of the retention element.

According to an embodiment, the securing structure comprises at least one arrangement region or at least one positive-locking element which is configured for positive-locking and/or non-positive-locking securing of the retention element on the winding head and/or at least one conductor element on the retention element. The at least one positive-locking element, preferably a plurality of them are provided, can be constructed as a clip, hook, flap or the like, whereby a hooking, clip-fitting, etcetera, to the winding head or the corresponding conductor elements, etc., is enabled. According to an embodiment, web elements, in particular resiliently constructed web elements, are provided and comprise one or more positive-locking elements.

According to an embodiment, the carrier structure has at least one recess which is configured for introducing at least one conductor end of a winding head of a stator. This enables the arrangement of the retention element as directly or immediately as possible on the winding head. The recesses are in particular configured/positioned or constructed in such a manner that the conductor ends of the winding head or also the conductor elements which are secured in the retention element can protrude through them counter to the arrangement direction, whereby the connection locations can be positioned in an optimum manner, as already described above.

According to an embodiment, the at least one positive-locking element is provided in the region of the at least one recess. To this end, in the region of the recess according to a preferred embodiment, there is arranged at least one web element which has the at least one positive-locking element. This benefits the already-mentioned two-layer structure again. Furthermore, the web element may have a degree of flexibility, which facilitates the arrangement of the retention element on the winding head.

At this point, it should be mentioned that, according to an embodiment, the retention element is shaped or formed, for example, from a plastics material, according to an embodiment with an injection-moulding operation. In addition, however, the retention element may also be shaped/formed from a metal or from a combination of the above-mentioned materials. The actual configuration is inter alia also dependent on whether or not the retention element is intended to be releasably secured in a non-destructive manner.

According to an embodiment, the retention element has at least one movable or displaceable securing element. Advantageously, such a securing element can be locked or unlocked, wherein the actual embodiment is dependent in particular on the shape of the winding head or the conductor. According to an embodiment, such a securing element is constructed as a sliding element, which is arranged with spacing from the carrier structure and which can be displaced parallel therewith, almost into the winding. Consequently, a displacement of the retention element counter to the arrangement direction is no longer possible. Unlocking is carried out by withdrawing the sliding element(s).

The advantages and features mentioned in connection with the method also apply similarly and accordingly to the retention element and vice versa. Other advantages and features will be appreciated from the following description of an embodiment of a method or a retention element with reference to the appended Figures. Various features can be combined with each other in the context of the invention in this case.

DETAILED DESCRIPTION OF THE DRAWINGS

Figure 1:
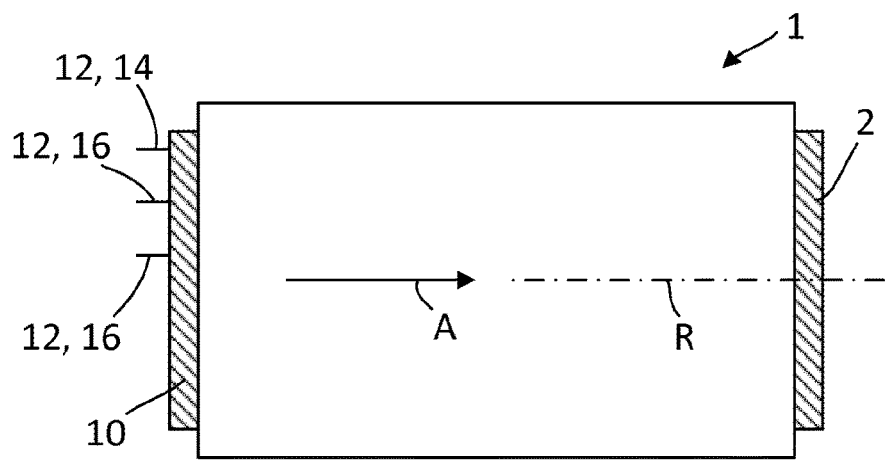
FIG. 1 is a side view of a stator prior to the arrangement of a phase connection sub-assembly.

FIG. 1 is a very highly schematic side view of a stator 1 of an electrical machine or an electric motor, which has a winding 2, wherein a winding head 10 is formed. The reference numeral 12 denotes three conductor ends of the winding head or winding ends, wherein it is schematically illustrated that two conductor ends 12 form or are intended to form a neutral point 16 and one conductor end 12 constitutes a phase end 14. The number of the phase ends 14 is in particular dependent on the winding structure. The phase ends are connected to a connection of the electric motor, for example, a UVW connection, cf., for example, FIG. 2 and reference numeral 30 at that location. A rotor which is not illustrated in this instance is arranged within the stator 1, wherein the rotation axis thereof is designated R. The reference numeral A refers to an arrangement direction of a retention element, wherein reference is also made in this regard to FIG. 2.

Figure 2:
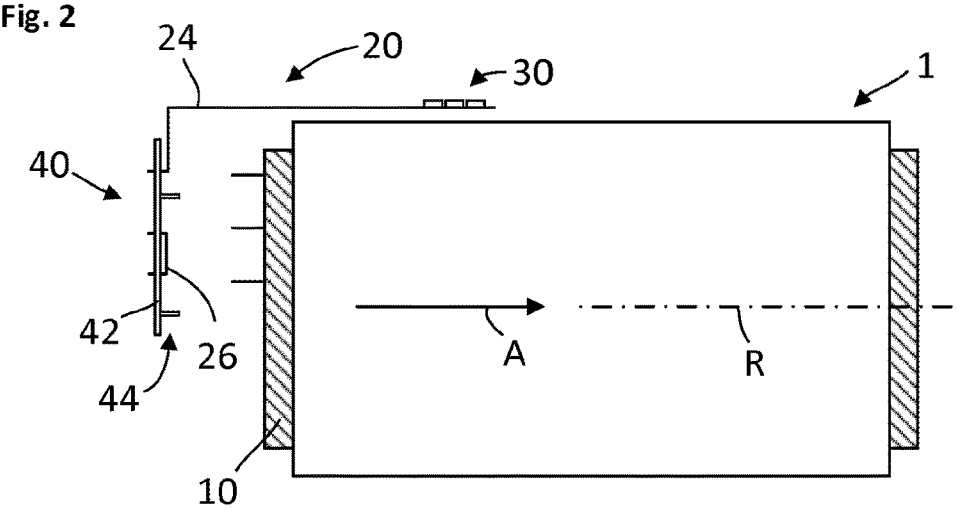
FIG. 2 shows a stator known from FIG. 1, wherein a phase connection sub-assembly is arranged thereon via a retention element in an arrangement direction.

FIG. 2 shows the stator 1 known from FIG. 1 and a schematically illustrated retention element 40, comprising a carrier structure 42 and a securing structure 44, wherein this is used inter alia for the arrangement of the retention element 40 on the winding head 10 and the arrangement of a phase connection sub-assembly 20 on the retention element 40, wherein this comprises a phase connection 24 and a switching bridge 26 in the drawing illustrated here. FIG. 2 shows that the retention element 40, comprising the phase connection sub-assembly 20, is arranged on the winding head 10 in the arrangement direction A.

Figure 3:
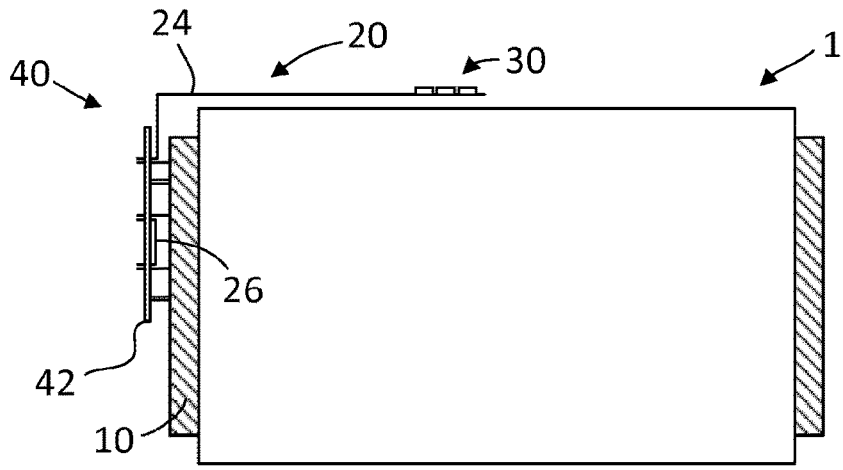
FIG. 3 shows the stator known from FIGS. 1 and 2, wherein the phase connection sub-assembly is retained on the stator by way of the retention element.

FIG. 3 shows how the phase connection sub-assembly 20 is arranged via the retention element 40 on the stator or the winding head 10. The arrangement or securing is carried out in particular via the securing structure 44 of the retention element 40, cf. in this regard also the schematic illustration in FIG. 2. Advantageously, in a manner of speaking, the switching bridge 26 and the phase connection 24 are positioned with respect to the conductor ends 12 by means of the retention element 40, in particular in order to connect it, for example, in a subsequent operating step, for example, in a positive-locking manner.

Figure 4:
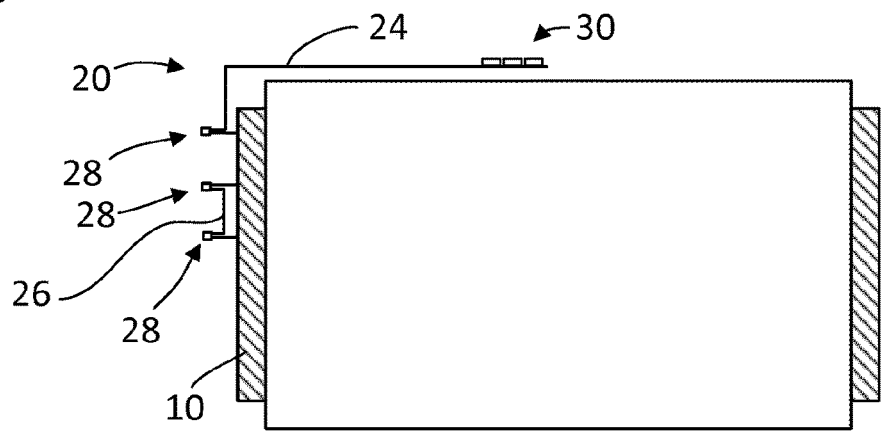
FIG. 4 shows the stator known from the previous Figures after the removal of the retention element.

FIG. 4 finally shows the phase connection sub-assembly 20, by way of example comprising the switching bridge 26 and the phase connection 24, which is secured directly and immediately and without the use or involvement of any auxiliary structures or the retention element 40 via connection locations 28 directly on the winding head 10. The winding head subsequently comprises only electrical conductors without auxiliary and/or retention or support structures, and can be optimally cast, coated or also left untreated. As a result of this construction type, optimum cooling is possible. For the removable retention element, disposable and reusable solutions are conceivable. Disposable solutions afford significant advantages with regard to the required logistics. Reusable solutions reduce the use of resources.

Figure 5:
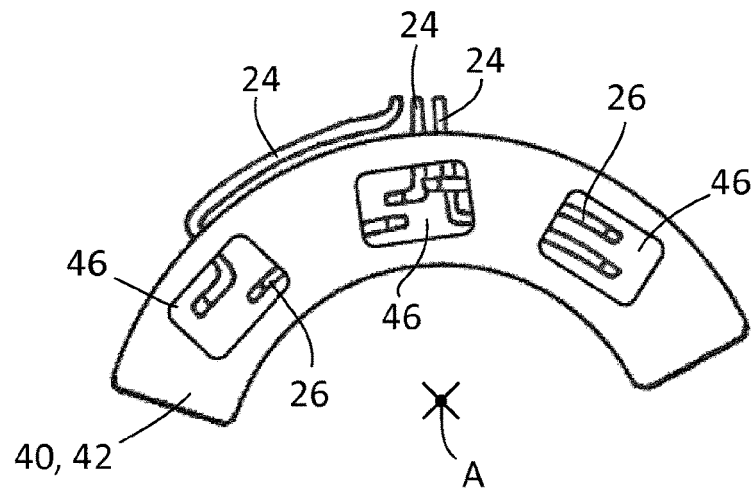
FIG. 5 is a schematic view of a retention element when viewed in an arrangement direction.

FIG. 5 is a schematic illustration of an embodiment of a retention element 40, when viewed in an arrangement direction A. In particular, a substantially circle-segment-like carrier structure 42 can be seen and has recesses 46. In a manner of speaking "below" the carrier structure, with respect to the drawing plane, there is provided a securing structure on which the electrical conductors of a phase connection sub-assembly are arranged. In the present schematic view these are two switching bridges 26 and three phase connections 24 for the phase U, V and W. Depending on the winding construction, there may, for example, also be six phase connections 24 which are connected in accordance with a (UVW) connection (not illustrated in this instance) of a phase connection sub-assembly.

Figure 6:
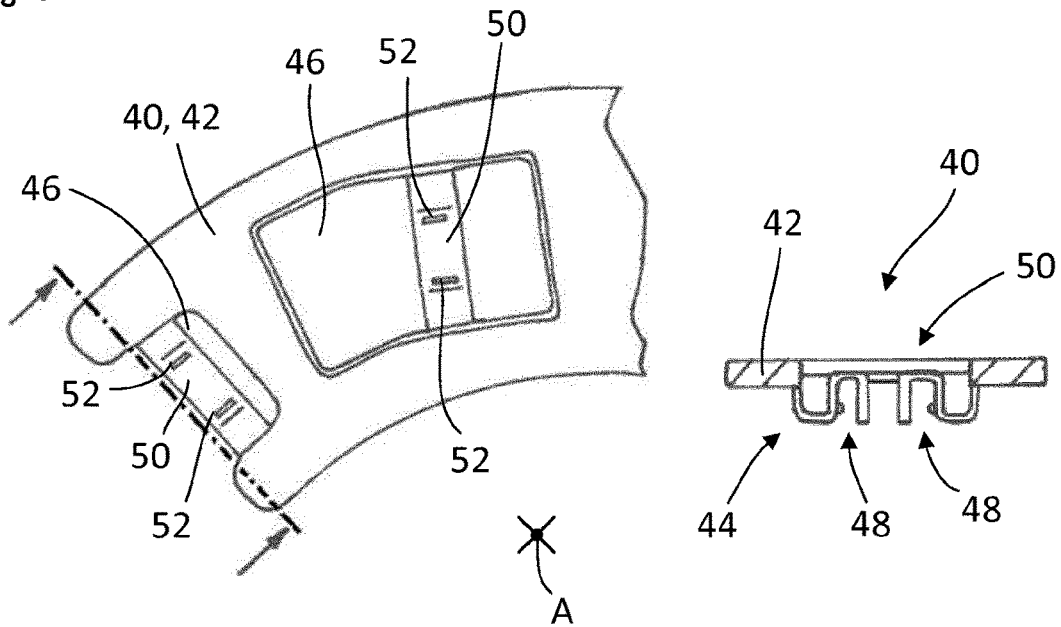
FIG. 6 shows two detailed views of an embodiment of a retention element.

FIG. 6 shows a cut-out of a retention element 40 in a similar perspective to FIG. 5 so that also in this instance, in particular, a plan view of a carrier structure 42 is provided. The carrier structure 42 has in this instance recesses 46, wherein web elements 50 are arranged within these recesses or in the region thereof and each have two slots 52 which increase the flexibility even further. The right half of the image shows a cross-section as illustrated in the left half of the image. Here in particular, the formation of the web element 50 can be seen and forms two arrangement regions or positive-locking elements 48, which the arrangement of the electrical conductors. The dual-layer structure is also clear in this instance, comprising a securing structure 44 and the carrier structure 42. Advantageously, the entire securing structure 44 is movable or constructed in a resilient manner to some degree, which is particularly also enabled by the slots 42. For better securing of the conductor elements which are not illustrated in this instance, the positive-locking elements 48 have in this instance smaller projections or protrusions which enable an additional positive-locking connection to the, for example, substantially rectangular conductors. The positive-locking connection elements 48 thus enable an arrangement or securing of the retention element 40 on the winding head or the conductor elements of the phase connection sub-assembly on the retention element.

Figure 7:
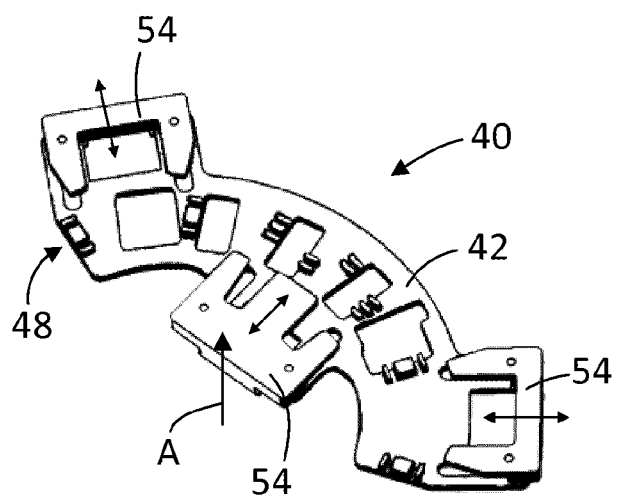
FIG. 7 shows a view of an embodiment of a retention element with displaceable securing elements.

FIG. 7 shows an embodiment of a retention element 40 with three movable or displaceable securing elements 54, in particular, therefore, a reusable solution of a retention element. The movability thereof is indicated by the double-headed arrows. The securing elements 54 can particularly be displaced parallel with a carrier structure 42 of the retention element 40 and can also be introduced virtually laterally into a winding head (not illustrated in this instance), wherein they bring about a releasable securing counter to an arrangement direction A.

LIST OF REFERENCE NUMERALS

1 Stator
2 Winding
10 Winding head
12 Conductor end
14 Phase end
16 Neutral point
20 Phase connection sub-assembly
22 Conductor element
24 Phase connection
26 Switching bridge
28 Connection location
30 (UVW) connection
40 Retention element
42 Carrier structure
44 Securing structure
46 Recess
48 Positive-locking element
50 Web element
52 Slot
54 Securing element
A Arrangement direction
R Rotation axis

What is claimed is:

1. A method for producing a stator, comprising:
providing a stator which comprises one or more windings and a winding head, wherein the winding head comprises one or more conductor ends;
positioning, via a retention element, a phase connection sub-assembly comprising at least one of a phase connection or a switching bridge on the winding head, wherein the phase connection sub-assembly comprises at least one conductor element;
connecting the at least one conductor element to a corresponding conductor end of the winding head;
removing the retention element;
wherein the at least one conductor element comprises:
a carrier structure having at least one recess which is configured for introducing at least one conductor end of the winding head of the stator; and
a securing structure arranged offset from the carrier structure,
wherein the securing structure comprises at least one positive-locking element which is configured for positive-locking and/or non-positive-locking securing of the retention element on the winding head and/or at least one conductor element on the retention element;
wherein the at least one positive-locking element is provided in the region of the at least one recess; and
wherein the retention element is constructed so as to be releasably secured to the winding head of the stator.

2. The method according to claim 1, further comprising:
removing the retention element from the winding head in a destruction-free manner.

3. The method according to claim 1, further comprising:
at least partially deforming or shaping the retention element for removal from the winding head.

4. The method according to claim 1, further comprising:
securing the at least one conductor element in or on the retention element in a positive-locking and/or non-positive-locking manner.

5. The method according to claim 1, wherein, when the at least one conductor element is connected to the corresponding conductor end, a connection location is formed, and further comprising:
arranging and positioning or shaping the at least one conductor element and/or the conductor end such that the connection location faces away from the stator.

6. The method according to claim 1, further comprising:
at least partially casting or coating the winding head after removal of the retention element.

7. A retention element for positioning a phase connection sub-assembly comprising at least one of a phase connection or a switching bridge on a winding head of a stator comprising one or more windings and the winding head, wherein the winding head comprises one or more conductor ends, and wherein the phase connection sub-assembly comprises at least one conductor element, comprising:
a carrier structure having at least one recess which is configured for introducing at least one conductor end of the winding head of the stator; and
a securing structure arranged offset from the carrier structure;
wherein the securing structure comprises at least one positive-locking element which is configured for positive-locking and/or non-positive-locking securing of the retention element on the winding head and/or at least one conductor element on the retention element;
wherein the at least one positive-locking element is provided in the region of the at least one recess; and
wherein the retention element is constructed so as to be releasably secured to the winding head of the stator.

8. The retention element according to claim 7, further comprising:
at least one displaceable securing element.

\* \* \* \* \*